United States Patent
Krause

(10) Patent No.: US 9,864,717 B2
(45) Date of Patent: *Jan. 9, 2018

(54) INPUT/OUTPUT PROCESSING

(71) Applicant: HEWLETT PACKARD ENTERPRISE DEVELOPMENT LP, Houston, TX (US)

(72) Inventor: Michael R Krause, Boulder, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/229,908

(22) Filed: Aug. 5, 2016

(65) Prior Publication Data

US 2017/0075846 A1    Mar. 16, 2017

Related U.S. Application Data

(63) Continuation of application No. 14/009,761, filed as application No. PCT/US2011/032307 on Apr. 13, 2011, now abandoned.

(51) Int. Cl.
| | |
|---|---|
| *G06F 3/00* | (2006.01) |
| *G06F 3/033* | (2013.01) |
| *G06F 13/40* | (2006.01) |
| *G06F 11/20* | (2006.01) |
| *G06F 12/0813* | (2016.01) |

(52) U.S. Cl.
CPC ...... *G06F 13/4059* (2013.01); *G06F 11/2025* (2013.01); *G06F 11/2066* (2013.01); *G06F 12/0813* (2013.01); *G06F 2212/314* (2013.01)

(58) Field of Classification Search
None
See application file for complete search history.

(56) References Cited

U.S. PATENT DOCUMENTS

| | | | |
|---|---|---|---|
| 3,541,541 | A | 11/1970 | Engelbart |
| 5,960,212 | A | 9/1999 | Mak |
| 6,047,323 | A | 4/2000 | Krause |
| 6,052,749 | A | 4/2000 | Purcell et al. |
| 6,098,112 | A | 8/2000 | Ishijima et al. |
| 6,141,701 | A | 10/2000 | Whitney |

(Continued)

FOREIGN PATENT DOCUMENTS

JP    8328989    12/1996

OTHER PUBLICATIONS

International Search Report, PCT/US2011/032307, filed Apr. 13, 2011, dated Jan. 2, 2012, English.

(Continued)

*Primary Examiner* — Hyun Nam
(74) *Attorney, Agent, or Firm* — International IP Law Group, P.C.

(57) ABSTRACT

The present disclosure provides an electronic device that includes a lower device configured to process local input/output communications between the electronic device and a host, wherein the lower device is stateless. The electronic device also includes a memory comprising a data flow identifier used to associate a data flow resource of the host with a data flow resource corresponding to the lower device. A data packet sent from the lower device to the host includes the data flow identifier.

20 Claims, 12 Drawing Sheets

(56) References Cited

U.S. PATENT DOCUMENTS

| | | | |
|---|---|---|---|
| 6,154,789 A | 11/2000 | Grieff et al. | |
| 6,314,501 B1 | 11/2001 | Gulick et al. | |
| 6,321,279 B1 | 11/2001 | Bonola | |
| 6,708,244 B2 | 3/2004 | Black et al. | |
| 6,718,392 B1 | 4/2004 | Krause | |
| 7,016,971 B1 | 3/2006 | Recio et al. | |
| 7,043,585 B2 | 5/2006 | Okin | |
| 7,103,744 B2 | 9/2006 | Garica et al. | |
| 7,318,102 B1 | 1/2008 | Krause et al. | |
| 7,346,699 B1 | 3/2008 | Krause et al. | |
| 7,404,190 B2 | 7/2008 | Krause et al. | |
| 7,415,034 B2 | 8/2008 | Muller et al. | |
| 7,487,327 B1 | 2/2009 | Chang et al. | |
| 7,496,713 B1 | 2/2009 | Ward et al. | |
| 7,650,386 B2 | 1/2010 | McMahan et al. | |
| 7,757,232 B2 | 7/2010 | Hilland et al. | |
| 7,904,576 B2 | 3/2011 | Krause et al. | |
| 8,682,775 B2 | 3/2014 | Owens et al. | |
| 2003/0047604 A1* | 3/2003 | McClure | G07C 13/00 235/386 |
| 2006/0194386 A1 | 8/2006 | Yao et al. | |
| 2006/0251109 A1* | 11/2006 | Muller | H04L 45/745 370/463 |
| 2007/0057918 A1* | 3/2007 | Zhou | G06F 3/0383 345/163 |
| 2007/0268820 A1 | 11/2007 | McGee et al. | |
| 2008/0307196 A1 | 12/2008 | Mitu et al. | |
| 2009/0003202 A1 | 1/2009 | Polk et al. | |
| 2009/0112563 A1 | 4/2009 | Drerup et al. | |
| 2009/0119663 A1 | 5/2009 | Mukherjee et al. | |
| 2009/0213857 A1 | 8/2009 | Haynie et al. | |
| 2010/0106866 A1 | 4/2010 | Aybay et al. | |
| 2010/0118884 A1 | 5/2010 | Hendel et al. | |
| 2010/0161847 A1 | 6/2010 | Riddoch | |
| 2010/0318761 A1 | 12/2010 | Moyer et al. | |
| 2014/0025859 A1 | 1/2014 | Krause | |
| 2014/0032796 A1* | 1/2014 | Krause | G06F 12/0831 710/29 |

OTHER PUBLICATIONS

International Search Report, PCT/US2011/032311, filed Apr. 13, 2011, dated Jan. 2, 2012, English.

International Search Report, PCT/US2011/032312, filed Apr. 13, 2011, dated Jan. 2, 2012, English.

* cited by examiner

INPUT/OUTPUT PROCESSING

BACKGROUND

Local input/output (I/O) processing generally refers to the communication between an information processing system, such as a general purpose computer, and peripheral devices, such as Network Interface Cards (NICs), graphics processors, printers, scanners, data storage devices, and user input devices, among others. Common I/O paradigms include Peripheral Component Interconnect (PCI) and PCI Express (PCIe). In these traditional I/O paradigms, peripheral devices are able to access main memory directly through Direct Memory Access (DMA) reads and writes. A device driver hosted by the processor reserves a portion of host memory for various queues and control structures to handle interactions with the peripheral device. Such information may be referred to as state information and may include, for example, transmit/receive queues, completion queues, data buffers, and the like. Further, the peripheral device creates a shadow copy of the state information in the local memory of the peripheral device. The state information informs the peripheral device about various aspects of the organization of the host memory, such as where to obtain work requests, the host memory addresses of related read and write operations, the location of completion queues, interrupt vectors, and the like. Accordingly, certain amount of processing overhead is directed to synchronizing the state information between the host and the peripheral device.

Traditional I/O protocols generally involve a large overhead of control commands associated with the information transmitted between the host and the peripheral device. For example, processing one Ethernet frame may involve 5 to 10 PCI transactions, which may result in a high degree of latency as well as inefficient use of the PCI bus or link. The techniques used to improve latency and efficiency often introduce added degrees of complexity in an I/O transaction. Further, if the state information between the host and the peripheral device becomes unsynchronized, the peripheral device can improperly access the host memory and cause silent data corruption, which is data corruption that goes undetected possibly resulting in system instability. Accordingly, various memory protection protocols are followed to reduce the likelihood that a peripheral device will access memory not allocated to it. The memory protection protocols add yet another level of complexity to the I/O processes.

BRIEF DESCRIPTION OF THE DRAWINGS

Certain embodiments are described in the following detailed description and in reference to the drawings, in which.

DETAILED DESCRIPTION OF SPECIFIC EMBODIMENTS

Exemplary embodiments relate to improved I/O transfer between a host and a device. Moreover, such exemplary embodiments may be adapted to provide data transfer rates in excess of 100 Gigabits per second (Gbps).

Various embodiments described herein provide a local Input/Output (I/O) paradigm or processing system that enables faster data rates over existing local I/O techniques. The I/O processing system may include a processor-integrated upper I/O device, referred to herein as the "upper device," and a lower I/O device, referred to herein as the "lower device." The upper device handles host resource management and error processing through a set of logic that is common to all I/O devices. Further, work queues, completion queues, data management structures, error handling structures, and other state information structures provisioned by the device driver are stored in resources associated with or integrated into the upper device.

The lower device can include any local peripheral device, such as a Network Interface Controller (NIC), a graphics processor, a printer, a scanner, a data storage device, and user input devices, among others. The lower device may be stateless, meaning that it does not maintain state of host-specific processing such as IOMMU mappings and it does not maintain state that is used by the host to continue to operate should the device fail. The stateless nature of the lower device means that the lower device does not include a shadow copy of the work queues, completion queues, data management structures, error handling structures, and other state information structures provisioned by the device driver and has no information regarding the mapping of the host memory. Thus, the lower device cannot directly access host memory, work queues, completion queues, data buffers, or other state information provisioned by the device driver.

Further, the read/write by address model used in traditional PCI systems is replaced by a push-push data flow model, wherein outbound data is pushed from the upper device to the lower device and inbound data is pushed from the lower device to the upper device. The flow of packets between the upper device and lower device may be controlled, at least in part, using data flow identifiers included in the packet header of each I/O packet. The data flow identifier is an opaque handle that may be encoding or created using information from several inputs. For example, the data flow identifier may be created from inputs including an application identifier (e.g., a process identifier), a virtual machine identifier, the lower device identifier, a processor core or thread logical identifier, and the like. Embodiments of the present techniques may be better understood with reference to FIG. 1.

Figure 1:
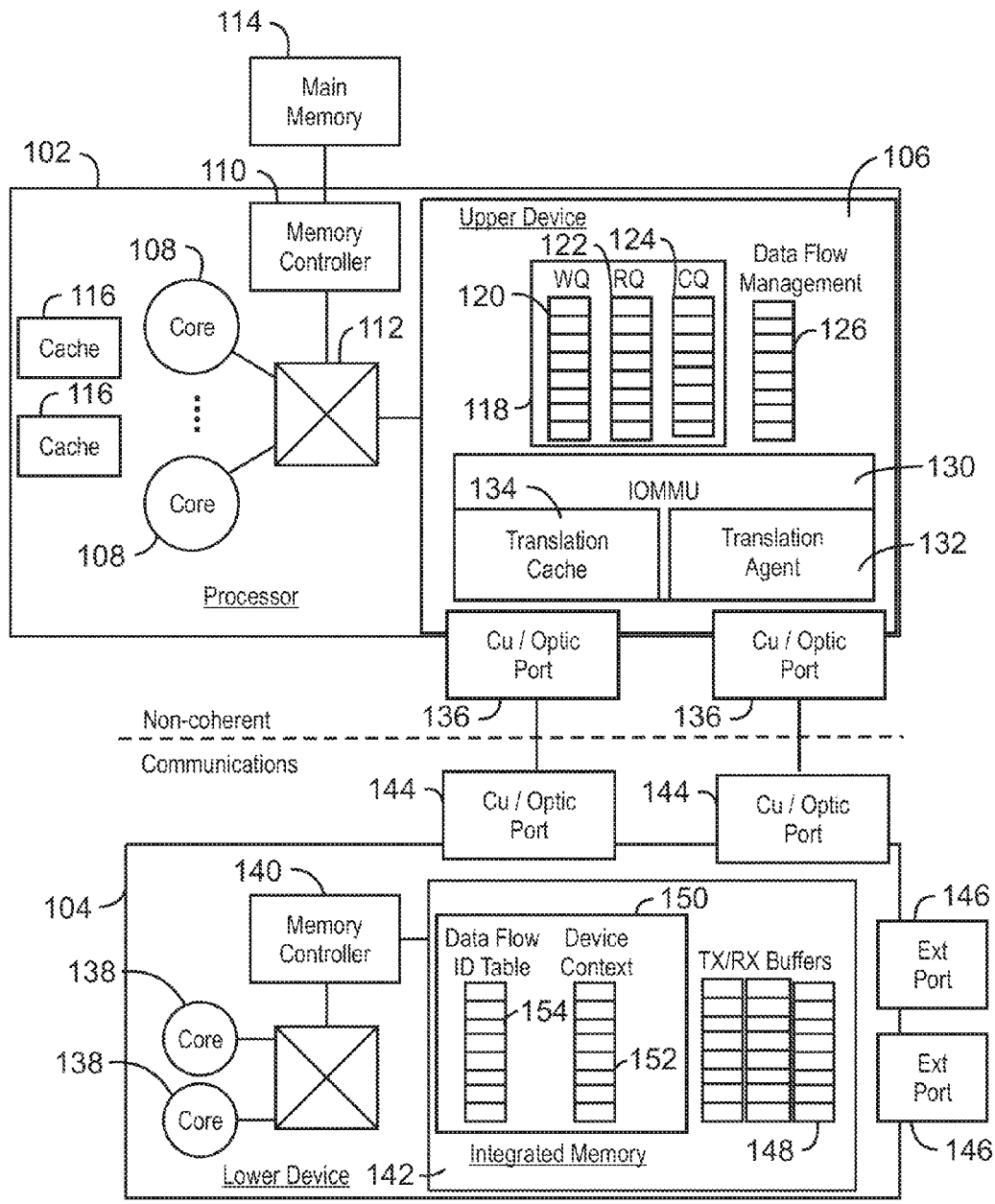
FIG. 1 is a block diagram of a local I/O processing system, in accordance with an embodiment.

FIG. 1 is a block diagram of a local I/O processing system, in accordance with embodiments. As shown in FIG. 1, the local I/O processing system 100 includes a processor 102 operatively coupled to a lower device 104 through an upper device 106, which may be integrated with the processor 102. The processor 102 can include one or more processor cores 108 coupled to a memory controller 110 and the upper device 106, for example, through a switch 112, which may include a crossbar switch, ring buffer, point-to-point internal mesh, and the like. In embodiments, the processor 102 can host one or more virtual machines.

The memory controller 110 may be operatively connected to a main memory 114, which may include dual inline memory modules (DIMMs), or a processor-integrated memory module, for example. In embodiments, the processor 102 also includes one or more integrated memory components such as one or more processor caches 116, which may be shared between the processor cores 108. The upper device 106 may be configured to access the main memory 114, the caches 116, or other memory components integrated with or coupled to the processor 102. As used herein the term "memory" is used to refer to any processor integrated memory or cache, discrete memory or cache, or upper device-integrated memory or cache. The memory may be accessed directly through hardware or indirectly through software, for example, using load/store semantics.

The processor 102 may be configured with a coherency protocol that manages the consistency of data stored in the various memory resources available to the processor, such as the caches 116 and the main memory 114. The coherency protocol is used to notify all processes running in the coherency protocol of changes to shared values. The upper device 106 operates in the coherency domain of the processor 102, meaning that the upper device 106 is notified with regard to memory changes and provides notification to the other processors regarding memory accessed by the upper device 106.

In an embodiment, the I/O system 100 does not include a PCIe Root Complex or the associated Root ports associated with traditional PCIe local I/O systems. The upper device 106 can control the flow of data between the memory resources associated with the processor 102 and the lower devices 104. The upper device 106 may be integrated with the processor 102 or may be included in the system 100 as a discrete I/O device operatively coupled to the processor 102. Furthermore, although one upper device 106 is shown, it will be appreciated that a processor 102 may have a plurality of upper devices 106, for example, hundreds or thousands of upper devices 106. Additionally, it will be appreciated that the upper device 106 may be integrated into the same circuit package or silicon chip as the processor 102.

The upper device 106 may include a variety data flow resources such as data and control buffers, which reside in reserved registers of main memory 114, upper-device integrated memory, processor-integrated memory such as cache 116, discrete memory associated with the upper device 106, or some combination thereof. For example, the data flow resources of the upper device 106 can include one or more transmit/receive queues 118. Each transmit/receive queue 118 can include a work queue 120, receive queue 122, and completion queue 124 used to process the various I/O operations received from or sent to the lower device 104. For example, I/O operations can include configuration operations, status operations, error handling and notification, memory reads, and memory writes, among others. The work queue 120 contains work requests related to I/O operations such as memory reads and writes. For example, each element of the work queue 120 relates to a particular memory operation and can include status information, read commands, write commands, starting memory address, and length of the corresponding memory operation, among others. The receive queue 122 contains work requests related to inbound data that are to be pushed to the upper device 106 from the lower device 104. The completion queue 124 is used by the upper device 106 to indicate that a particular I/O operation contained in a corresponding work queue 120 or receive queue 122 has been processed. The work queues 120, receive queues 122, and completion queues 124 may be coherently managed by software running on the processor 102 such as a general-purpose device driver interface. Furthermore, although one set of work queues 120, receive queues 122, and completion queues 124 are shown, it will be appreciated that the upper device 106 may include multiple queues, each related to a different work flow, or associated with a different lower device 104.

The upper device 106 can also include a data flow management structure 126, which can include various information related to I/O processing management, such as quality of service (QoS) data, security data, and the like. Thus, the data flow management structure 126 of the upper device 106 may also include I/O virtualization (IOV) structure data, which provides management information associated with each virtual machine running on the processor 102. The data flow management structure 126 may also contain data flow information corresponding to each attached lower device 104. For example, the data flow management structure 126 may associate each lower device 104 with a specific data flow identifier. The upper device 106 exchanges packets with the lower device 104 via one or more electrical conductors or optical interface ports 136. The interface ports 136 may be point-to-point or bus attached.

In embodiments, the upper device 106 includes an I/O memory management unit (IOMMU) 130 used to identify physical memory address associated with memory read and write operations. The IOMMU 130 can also be used to validate memory access operations to ensure that a particular process attempting to access memory has the appropriate access rights for the memory address or addresses targeted by the process. The IOMMU 130 can include a translation agent 132 and translation cache 134. The translation agent 132 may be configured to identify a physical memory address for memory read or write operations. The translation cache 134 may be used to store memory address translations for more frequently used memory locations.

The lower device 104 may include one or more processor cores 138, a memory controller 140, and local device-integrated or discrete memory 142. The lower device 104 communicates with the upper device 106 through ports 144, which may be electrical conductors or optical ports, for example. In embodiments, the lower device 104 may also include external ports 146, such as Ethernet or storage ports, for communications with external devices. For example, the storage ports may include Fibre Channel ports or SCSI ports, among others. Additionally, the lower device 104 may be integrated with the processor 102, for example, in the same circuit package or on the same silicon chip as the processor 102 and the upper device 106.

Unlike traditional I/O devices, the lower device 104 does not include work queues, receive queues, or completion queues corresponding to the work queues 120, receive queues 122, and completion queues 124 included in the upper device 106. Further, the lower device 104 does not have direct access to the IOMMU 130 of the upper device 106 nor does it need to comprehend memory translations from the IOMMU 130. This differs from traditional I/O which may a priori acquire translated addresses to allow subsequent device I/O transactions to bypass the IOMMU 130 and translation cache to improve performance. In accordance with exemplary embodiments, communications between the upper device 106 and lower device 104 may be controlled, at least in part, by the use of data flow identifiers. Each packet pushed from the lower device 104 to the upper device 106 or pushed from the upper device 104 to the lower device 106 will include one or more data flow identifiers, which are used to identify the targeted resources. The lower device 104 does not operate in the coherency domain of the system 100, meaning that it does not have knowledge of physical memory address and does not receive direct notification with regard to memory or processor cache control and update operations.

The lower device 104 can include a variety of data and control buffers, which reside in device integrated or discrete memory 142 as well as device-specific logic, depending on the function and resource capabilities of the lower device 104. For example, the lower device 104 may include transmit/receive buffers 148 for handling data transferred to and from the external devices through the external ports. The lower device 104 may also include a device management table 150, which may include a device context table 152 and a data flow lookup table 154. The device context table 152 can be used to store configuration and control information, operation processing policies, error handling and management statistics, and information related to data flow through the lower device 104, such as Management Information Blocks (MIB), and Common Information Model (CIM), among others.

In embodiments, link-level flow control between the upper device 106 and lower device 104 may be configured to control the transmission of I/O packets based on the availability of resources in the receiving device to accept and process the incoming packets. Link-level flow control between the upper device 106 and lower device 104 may be implemented using, for example, a credit-based protocol. In credit-based flow control, the receiving device allocates an initial credit limit to each sending device. The sending device paces its transmission of I/O packets to the receiving device based on the number of credits it receives from the receiving device. When sending I/O packets to the receiving device, the sending device tracks the number of credits consumed by each I/O packet from its account. The sending device may only transmit an I/O packet when doing so does not result in its consumed credit count exceeding its credit limit. When the receiving device finishes processing the I/O packet from its buffer, it signals a return of credits to the sending device, which then increases the credit limit by the restored amount. It will be appreciated that other link-level flow control techniques may be used in accordance with embodiments.

The data flow lookup table 154 may be a filter table, which associates each internal or external resource with a unique data flow identifier. The data flow lookup table 154 may be populated, for example, by a device driver running on the processor 102. The device driver that populates the data flow lookup table 154 may be a general purpose device driver or a dedicated device driver associated with the specific device. The data flow lookup table 154 may be used by the lower device 104 to target a specific resource of the upper device 106 when receiving data from or pushing data to the upper device 106. The specific configuration of the data flow lookup table 154 may vary depending on the particular implementation. For example, in the case of an Ethernet-based lower device 104, the data flow lookup table 154 associates external data flow, such as Ethernet frames, to an internal flow between the upper device 106 and lower devices 104. For example, the data flow lookup table 154 may include a set of unique data flow identifiers. Each data flow identifier may be associated with one or more fields contained in the Ethernet frame, such as the source MAC address, destination MAC address, Virtual LAN Identifier (VID), Service VLAN ID (SVID), and Tenant Service Identifier (TSID), among others. Upon receipt of an Ethernet frame by the lower device 104 from an external device, the Ethernet header may be parsed to identify any set of fields contained within the Ethernet Header. This parsed data may then be applied to the data flow lookup table 154 to identify a corresponding data flow identifier used for transferring the data to the upper device 106. Ethernet-based communications received by the lower device 104 from the upper device 106 may also include the same data flow identifier. The lower device 104 may then use the data flow identifier to identify the corresponding fields used to generate an Ethernet frame to be transmitted to the external device.

In embodiments, the lower device 104 may be a graphics processing unit (GPU), in which case, the lower device 104 can perform calculations on data received from the upper device 106 and send the result back to the processor 102 through the lower device 104 or to a frame buffer, for example. Applications running on the processor 102 may be configured to scale on a per core 108 or per thread basis, enabling several graphics processing elements to be processed in parallel. Further, the GPU may also include a plurality of GPU processor cores, for example, the processor cores 138. The data flow lookup table 154 may include a set of unique identifiers used to associate a set of GPU processing cores with a specific processor core 108 or process thread. In this way, the work can be processed in parallel to make efficient use of the performance scaling. In an embodiment, the GPU-based lower device 104 may be shared by multiple virtual machines. Each virtual machine may be represented by a specific data flow identifier that allows the virtualization software to comprehend which set of upper devices 106 and lower resources 104 are being used by a given virtual machine. This may enable solutions to optimize the operations and improve scaling.

In embodiments, the lower device 104 may be a storage controller. The storage workload may be distributed across a plurality of the processor cores 108 or processing threads to increase scalability. For example, the storage workload may be distributed on a per LUN basis, a per world-wide unique identifier (WWID) basis, a per VM instance basis, and the like. In the case of a storage controller, the data flow lookup table 154 may be used to associate specific host resources with specific storage resources. For example, the data flow lookup table 154 may include a set of unique data flow identifiers, each data flow identifier associated a specific LUN, WWID, VM instance, and the like. In this way, the data flow lookup table 154 provides a fast lookup mechanism that enables the lower device 104 to target specific host resources that are rarely, if ever, shared by multiple processor cores or threads. Distributing the storage workload in this way helps to prevent contention for the host resources by reducing the sharing of host resources between multiple processor cores 108 or threads, thus reducing cache-to-cache communication. This also allows for resource contention and serialization code to be eliminated, which reduces the overhead for each operation.

In embodiments, the lower device 104 may be a USB host controller used, for example, to couple one or more peripheral devices to the processor 102. Each external port may be a USB controller port coupled to a peripheral device such as a mouse, keyboard, printer, scanner, and the like. In the case of a USB host, the data flow lookup table 154 associates each USB port with a specific resource of the upper device 106. For example, the data flow lookup table 154 may include a set of unique data flow identifiers, each data flow identifier associated with a specific USB port identifier.

In traditional PCIe-based communications, a device driver would create a set of resources in host memory that are accessed through PCI DMA operations from the PCI device, and the peripheral I/O device would include a shadow copy of the host resources, enabling the peripheral I/O device to specifically target resources of the host such as the transmit receive work queues. For example, the traditional peripheral I/O device would be able to obtain work requests directly from the work queue or write data to a specific receive queue. Further, a traditional PCIe-based IOMMU identifies physical memory address corresponding to a particular memory read or write operation received from a peripheral I/O device using a virtual memory address provided by the PCIe-based peripheral device and Requester ID associated with the peripheral device. Unlike traditional PCI or PCIe communications, the lower device 104, in accordance with embodiments of the present invention, does not have access to resources of the upper device 106, such as the transmit/receive work queues. Further, the lower device 104 does not have any data regarding the mapping of the memory resources of the upper device 106.

Unlike a traditional local I/O communications, the destination for data pushed from the lower device 104 to the upper device 106 or from the upper device 106 to the lower device 104 is determined based on the data flow identifiers. The data flow identifier is not a memory address and is not used by the lower device 104 to directly access host memory. Rather, the data flow identifier is an index or pointer, for example. A data flow identifier may be included with each pushed data packet and identifies the target destination for the data. For example, the data flow identifier can be used by the upper device 106 to identify a corresponding physical memory address associated with the data flow identifier. The process by which the upper device 106 uses the data flow identifier to identify a corresponding physical memory address may vary depending on the particular implementation.

When a data flow is established between and the upper device 106 and the lower device 104, the upper device 106 creates the data flow identifier. As described above, the flow identifier is an opaque handle, which may be encoding or created using information from several inputs. For example, the handle may be created to understand the application identifier (e.g., a process identifier), the virtual machine identifier (if used), the lower device identifier, the processor core or thread logical identifier, and the like. Using this information, the relevant application, such as the operating system or the user application, may post multiple receive buffers, which embed this information into each receive queue element. The receive queue may be populated by the application ahead of actual access by the lower device 104. The application may also create read or write access rights prior to any data being exchanged. For example, the application may set up a number of receive buffers initially and then over time add in more or replenish them as they are consumed. For read requests, the application may set up a range of host memory that is accessed by remote applications. This set up occurs prior to any read operation being issued. Similar to the write operation, the number of reads allowed or the address ranges may be dynamically updated based on application-specific needs.

In embodiments, the upper device 106 includes a plurality of receive queues 122, wherein each data flow identifier is associated with a specific one of the plurality of receive queues 122. Upon receipt of an I/O packet from the lower device 104, the upper device 106 may extract the data flow identifier from the packet header, and identify the receive queue 122 and receive queue element corresponding to the I/O packet. The receive queue element may contain a descriptor that defines how to process the data that arrived. For example, the receive queue element may contain a set of physical addresses that describe where the data is to be placed in memory 114 or cache 116. In an embodiment, the receive queue element may contain a translation handle that is used to access the IOMMU to acquire the physical addresses that allow the data to be placed.

In an embodiment, the receive queue element may be an anonymous buffer that is posted by the application, but the application does not comprehend what will arrive for that buffer. The receive queue element may contain or point to logic that is used to address a specific address location as a function of the data that arrives. The upper device 106 may contain some embedded processing capacity that allows it to parse the data that has arrived and take action based on the data contents. For example, the upper device 106 may determine whether the data is encrypted and if so then invoke a decrypt function. In another example, the upper device 106 may determine whether the data is of a particular format, such as XML schema, in which case the upper device 106 may redirect the data to an XML accelerator. It will be appreciated that the upper device 106 can contain a wide range of optional functionality.

In an embodiment, the receive queue element includes a data structure with a set of virtual memory addresses. When the packet arrives, the upper device 106 can access the receive queue element and determine what portion of the packet corresponds with the different virtual address ranges. Working in conjunction with the IOMMU 130, the upper device 106 determines the real physical addresses and places or copies the data to these locations, which may or may not be contiguous. For example, in the case of a received network packet, the receive queue may contain an address where the network headers are to be written and an address where the data payload is to be written. The network headers are consumed by a network stack while the data payload may be directly placed in the application's memory, thus providing real copy avoidance. In other words, direct placement eliminates the need for software executing in a processor core or thread performing the traditional software-based copy operation between the traditional device driver's memory and the application's memory. In another example, if the data payload uses an XML schema or other protocol, the network or storage headers may be stripped and the data payload redirected to an accelerator or to a special process within the host that provides additional value-add processing.

In some embodiments, the receive queue 122 may contain a virtual memory address, which may be associated, for example, with a particular virtual machine running on the processor 108. The upper device 106 may translate the virtual memory address into a physical memory address associated with the virtual machine and perform access validation using the IOMMU 130. In embodiments, the receive queue element includes an actual physical memory address, and the IOMMU 130 may be skipped, thereby further reducing latency of the operation and improving overall system performance. Furthermore, the data flow identifier can be associated with multiple receive queues 122, in which case the data flow identifier acts as a multicast group identifier for multicast operations that target two or more hosts, such as two or more virtual machines. The payload data may be automatically replicated to multiple receive buffers without the use of a host software invocation or multiple DMA writes.

In embodiments, the IOMMU 130 may be configured to receive the flow identifier from the lower device 104. The IOMMU 130 may be configured to determine a physical address and perform access validation based on the flow identifier received from the lower device 104. In embodiments, the IOMMU 130 may be configured to identify a specific element of the receive queue 122 based on the data flow identifier received from the lower device 104. The receive queue element may be programmed by the upper device 106 with a look up address associated with the operation. Upon receiving a write operation from the lower device 104, the IOMMU 130 can use the flow identifier to identify the corresponding receive queue element, extract the look up address contained in the receive queue element, and translate the look up address into a physical memory address. In some embodiments, the look up address contained in the receive queue 122 is a virtual memory address, which may be associated, for example, with a particular virtual machine running on the processor 108. In embodiments, the receive queue element may contain the actual physical memory address itself, enabling the IOMMU 130 to be bypassed entirely to reduce latency and increase overall system performance.

In embodiments, the IOMMU 130 may implement access policies for specific data flows based on the data flow identifier. The access policy of the IOMMU policy determines whether the lower device 104 is allowed to read from or write to a specific memory address. In embodiments, the IOMMU 130 enables the lower device 104 to read from or write to a specific memory address during a specified time window. The IOMMU 130 may be configured to associate a specific data flow identifier with a specific physical memory address translation, which is enabled for a specified amount of time. When the time window elapses the memory address translation may be removed by the IOMMU 130. I/O packets received from the lower device 104 outside of the time window and using the same flow identifier would thereby be blocked. Such time-window access may be useful, for example, in processing writes to a database, constructing security policies that govern memory access, and so forth.

In embodiments, the IOMMU 130 may implement a read-once or a write-once access policy. In implementing the read-once or write-once policy, the IOMMU 130 may associate a specific data flow identifier with a specific physical memory address translation. Upon receiving an I/O packet from the lower device 104 that references the corresponding data flow identifier, the IOMMU 130 translates the data flow identifier into the specific physical memory address and then removes or invalidates the translation. Subsequent I/O packets with the same data flow identifier would thereby be blocked. Similarly, the IOMMU 130 may implement an access policy that enables a specified number of reads or writes greater than one before invalidating the translation.

Various other improvements and simplifications can be realized by the present techniques. For example, data transmitted between the upper device 106 and lower device 104 may be replicated across two or more links between the upper device 106 and the lower device 104. In this way, the upper device 106 and lower device 104 will still be able to communicate if one of the link fails, even if the failure occurs during an ongoing transaction. Additionally, the upper device 106 may be configured to replicate data packets to two or more lower devices 104, and the lower device 104 may be configured to replicate data packets to two or more upper devices 106. Such replicated data transmission may enable improved failover techniques, for example.

Similar to replication, the communications may be distributed across multiple paths between the upper device 106 and the lower device 104, which may increase the aggregate bandwidth for data transmission between the upper device 106 and lower device 104. Furthermore, packets may also be multicast from one upper device 106 to multiple lower devices 104 or from one lower device 104 to multiple upper devices 106. Multicasting may be performed using an optical or copper bus structure or an intermediate switch between the upper devices 106 and the lower devices 104. Multicasting enables information to be easily replicated between components without having to perform a plurality of unicast transmissions.

In embodiments, the upper device 106 may be used to perform co-located inter-VM communications without any interaction with the lower device 104 or associated lower device logic. Co-located inter-VM communications refers to communications between two or more virtual machines hosted by the same processor or set of processors within the same coherency domain 102. The upper device 106 can be used in conjunction with the IOMMU 130 to implement a direct I/O (DIO) communication model. For example, a hypervisor could program the data flow lookup table 142 with a unique flag that indicates that the target lower device 104 is one or more co-located virtual machines instead of an actual lower device 104. When the upper device 106 detects this flag, it targets the destination VM's resources, translates the destination buffers via the IOMMU 130, and performs the appropriate data movement. By performing inter-VM communications as described above, the use of a software virtual switch (vSwitch) or a device-integrated Virtual Ethernet Bridge (VEB) may be eliminated.

Figure 2:
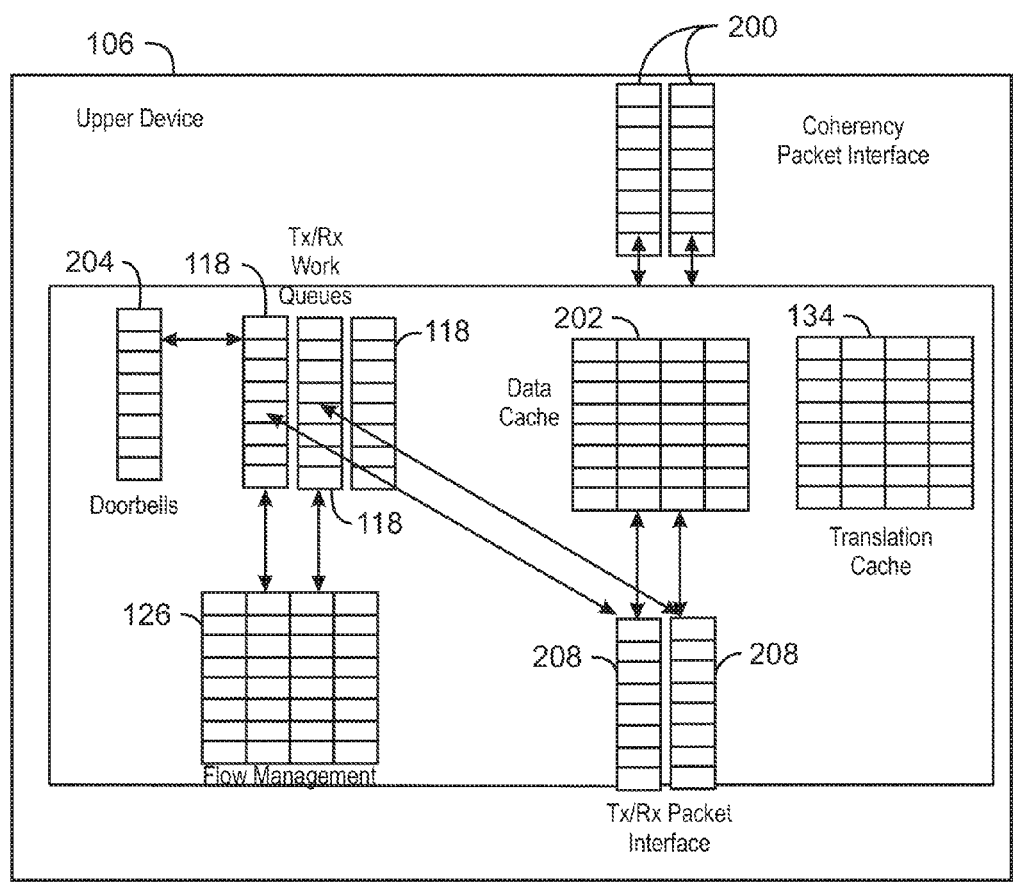
FIG. 2 is a block diagram of an upper device, in accordance with an embodiment.

FIG. 2 is a block diagram of an upper device 106, in accordance with embodiments. As shown in FIG. 2, the upper device 106 includes a coherency packet interface 200 used to communicate with the processor cores 108 and memory controller 110 (FIG. 1). The coherency packer interface 200 resides in the upper device 106 and executes a memory coherency protocol according to the design of the processor.

The IOMMU translation cache 134 holds recently accessed IOMMU entries with a focus on reducing IOMMU access latency and coherency interface structures. The IOMMU access validation and translations may be done within the upper device 106 or the requests may be forwarded to IOMMU logic resident in another portion of the system for processing. Combining the upper device 106 with the IOMMU validation logic reduces latency and enables more efficient resource utilization.

The upper device 106 can also include a data cache 202 that holds data to be transmitted to or received from the lower device 104. The data cache 202 may be continuously updated to or from caches of the processor cores 108, the memory controller 110, or the main memory 110 through the coherency interface 200. Furthermore, some processing related to the moving of packets, such as packet header manipulations, may be performed on the data stored to the data cache. The upper device 106 also includes transmit/receive work queues 118, which contain work requests initiated by a read or write request from the lower device 104 or a request from a processor core 108 to push data to the lower device 104, for example. Each of the transmit/receive work queues 118 may be associated with a different data flow identifier.

In an embodiment, the upper device 106 may include a queue for processing inbound write requests a separate queue for processing inbound read requests. Inbound write request may target a corresponding receive queue, while an inbound read request may target a separate read work queue. In the case of a read, the upper device 106 does the same series of steps to validate and translate the address range but also gathers up the memory data into a buffer, such as the data cache 202, and pushes the memory data to the lower device 104. The header associated with this pushed data may contain information from the lower device 104 that allows it to correlate the returned data buffer with the originating read request.

The upper device 106 also includes a number of work flow control mechanisms, such as doorbells 204, used to launch work requests from the processor cores 108. The doorbells 204 may be accessed by the processor cores 108, but are not accessible to the lower device 104. The work requests can involve moving application data, operating system data, control data regarding the upper device 106, and the like. The data flow management structure 126 may be used to describe the resources of the upper device 106, such as the memory location, and size, of the translation cache 134, data cache 202, and other data structures. The data flow management structure 126 may be used to store data that associates each lower device 104 (FIG. 1) with a specific data flow identifier.

The upper device 106 may also include one or more transmit/receive packet interfaces 208, which are used to communicate with one or more lower devices 104. The upper device 106 pushes packets to the lower device 104 by translating data flow information associated with operation into an I/O packet header, which includes the data flow identifier. The upper device 106 concatenates the I/O packet header to the data payload and transmits concatenated header/data payload to the lower device 104. Similarly, the lower device 104 pushes packets to the upper device 106. The packets pushed up from the lower device 104 also include payload data and a packet header, which contains a data flow identifier. The upper device 106 removes the header and processes the data. For example, the data flow identifier may be used to determine which receive queue or receive queue element is associated with the packet. Additionally, the upper device 106 may perform IOMMU access validation and address translation based on the data flow identifier. Depending on the result of the access validation, the upper device 106 then transfers the data payload to main memory or directly to a processor cache through the coherency packet interface and updates the appropriate completion queues 120 (FIG. 1). In an embodiment, the data flow identifier can include a hint that the data has near-term use, meaning that the data is going to be used quickly by a processor core or thread. In response to the hint, the upper device 106 may place the data in the processor's cache 116 rather than the main memory 114.

The data flow identifier may be a single value, e.g. a N-bit identifier that acts an opaque handle. For example, N may be small to very large, for example 16-bits to as much as 256 bits. The data flow identifier may be encoded with a set of information that allows either the upper device 106 or the lower device 104 to quickly access and comprehend how to process the data. The data flow identifier may also be equated to multiple fields within the protocol header used when transporting the data between the upper devices 106 and lower devices 104. For example, the data flow identifier might contain a set of fields such as <upper device id>, <lower device id>, <queue set id>, <priority class>, <device class id>, <operation type>, and the like. Using these fields, either lower or upper device can take actions to uniquely identify the data flow and process the data.

Figure 3:
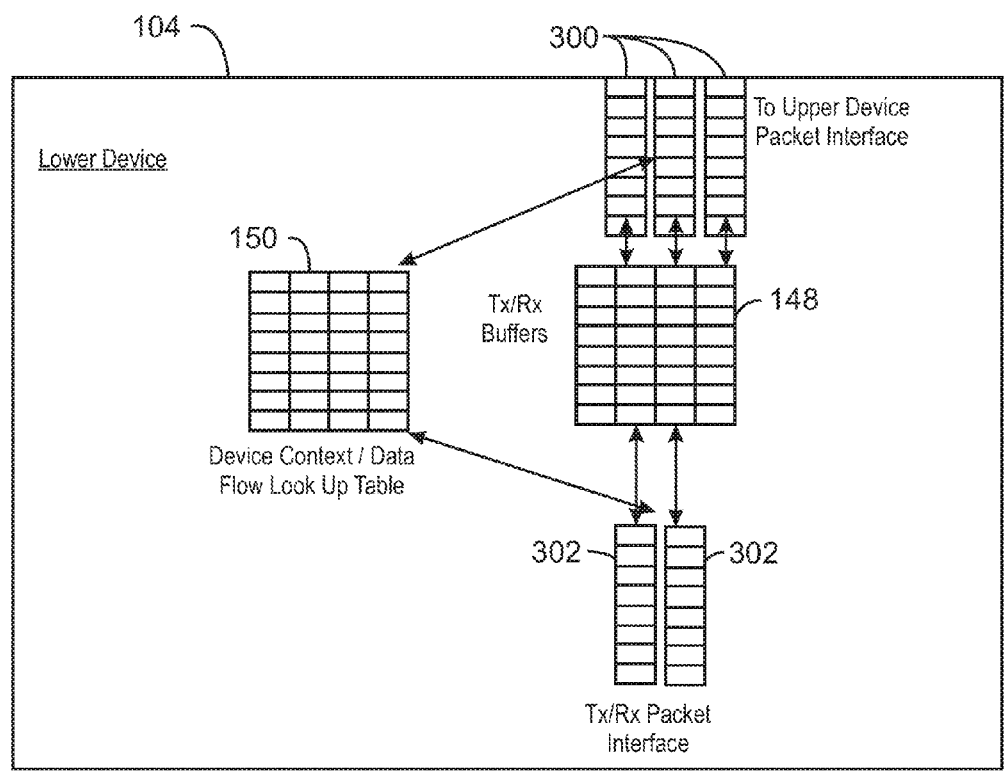
FIG. 3 is a block diagram of a lower device, in accordance with an embodiment.

FIG. 3 is a block diagram of a lower device 104, in accordance with embodiments. As shown in FIG. 3, the lower device 104 no longer contains doorbells, transmit/receive work queues, and various other data structures associated with traditional peripheral I/O devices. In some embodiments, the lower device 104 includes one or more upper device packet interfaces 300 for sending I/O packets to and receiving I/O packets from the upper device 106. The packet interface 300 includes the logic that deals with the actual physical processing of information to or from the physical port2 144. Two or more upper device packet interfaces 300 may be configured to communicate as a group with a single upper device 106. The group of upper device packet interfaces 300 may be configured as a failover group. The group of upper device packet interfaces 300 may be configured to implement load balancing techniques, wherein data may be split onto separate flows, each associated with a different data flow identifier.

The lower device 104 may implement one or more packet interfaces 300. Each packet interface 300 may communicate with one or more upper devices 106 through either point-to-point, bus-based, or switch-based fabrics. The lower device 106 may communicate through two or more of the packet interfaces 300 to a given upper device 106, which also supports two or more packet interfaces 208. The packet interfaces 300/208 may be configured as active-active, wherein all packet interfaces 300/208 are used to transmit and receive packets between the devices at the same time. The packet interfaces 300/208 may also be configured as active-passive where one set of packet interfaces is active and the others are treated as stand by. Either active-active or active-passive may be used to provide fail-over services in the event the interface or path between the upper device 106 and the lower devices 104. The active-active configuration can also provide higher performance since multiple interfaces are operating in parallel, thereby increasing the aggregate bandwidth and number of packets per second that can be exchanged. In some embodiments, a particular data flow will be constrained to a single packet interface between the upper device 106 and the lower device 104, thus ensuring that all packets are transmitted and arrive in the order they are posted.

The active-active configuration may also be used to stripe data across multiple packet interfaces. Striping data across multiple packet interfaces increase per data flow aggregate bandwidth and reduces latency. A variety of techniques may be used to ensure that all of the data arrives and that the proper ordering is preserved from the application perspective. For example, a control signal may be sent, either as a discrete packet or within the packet header. The control signal can be used to indicate that the final packet has been transmitted on each packet interface. The receiving device (upper device 106 or lower device 104) does not consider the exchange completed until it receives a final indication from all packet interfaces. Once the control signals are received, the device may execute the post processing as if the data had been transmitted across a single packet interface. In an embodiment, the upper and lower devices may be configured to support data stripping combined with fail-over are capabilities.

In an embodiment, the active-active configuration can also be used this to transmit the same data on both interfaces. The upper device 106 and lower device 104 will see the same data arrive on multiple interfaces and discard the duplicate data. If the data arrives on only one interface, then the devices know that one of the interfaces has failed. No data loss will have occurred since the data was transmitted over two or more discrete paths. This technique enables a significantly higher available solution to be constructed, which today is not possible to do using PCI-based technologies.

The lower device 104 may also include one or more transmit/receive packet interfaces 302 for communicating with an external fabric or internal processing elements within the lower device 104. For example, each transmit/receive interface may be coupled to an Ethernet port, a storage port, a USB port, and the like. The transmit/receive buffers 148 hold data to be transmitted to or received from the lower device 104. The transmit/receive buffers 148 may be continuously updated from the upper device packet interface or each external port's transmit/receive packet interface. Furthermore, some processing related to the moving of packets, such as packet header manipulations, may be performed on the data stored to the transmit/receive buffers 148. The transmit/receive buffers 302 can also be used as the command and data buffers used, for example, in a GPU.

The device management table 150 may be used to translate inbound I/O data packets into the appropriate upper device I/O packet header. In embodiments, the lower device 104 also includes communication to an external fabric, for example, Ethernet, in which case the data flow lookup table 142 can also be used to translate outbound I/O data packets into the appropriate the external device header. The device management table 150 may also include a device context memory used to describe the resources of the lower device 104, such as the memory location, and size, of the device data structures such as the Transmit/Receive buffers 148, data flow lookup table, and the like.

The lower device 104 can receive data pushed to it by the upper device 106, perform the appropriate header manipulations, and process the data or push it out to an external fabric. The lower device 104 can also receive data pushed to it from an external fabric, perform the appropriate header manipulations, process the data, and push the data to the upper device 106 for processing by an application or operating system, for example. In embodiments, the lower device 104 also performs various calculations on the data pushed to it from the upper device 106 or an external device. For example, the lower device 104 may be programmed to perform graphics related calculations common to graphic processing units, and packet encryption, among others. However, the lower device 104, in accordance with some embodiments, does not use the PCI communication semantics and does not replicate state or perform state maintenance related to the processor or the applications running on the processor. The stateless operation of the lower device 104 enables the lower device hardware and software to be significantly simplified compared to traditional peripheral I/O devices. Furthermore, because the large overhead of control commands associated with traditional PCI communications is eliminated, communications between the upper device 106 and the lower device 104 in accordance with present techniques is more efficient. For example, a data transfer between the upper device 106 and lower device 104 may be accomplished with as little as a single packet.

In an embodiment, the lower device 104 may be a PCI-based device. In such an embodiment, the lower device 104 may include a PCIe root complex and associated root ports for communicating with external devices. However, the upper device 106 would itself not be directly involved in the PCI-based communications. Rather, the PCI-based lower device 104 would be just another lower device 104 supporting yet another protocol which in this case is PCI.

Figure 4:
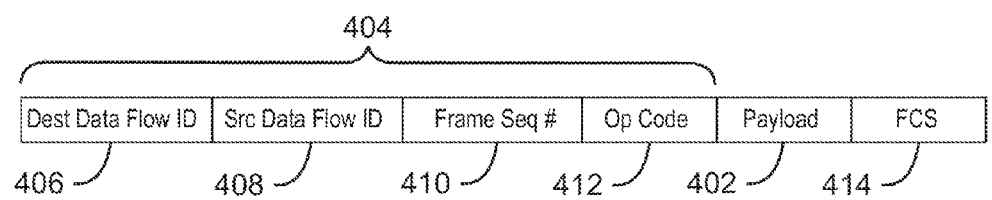
FIG. 4 is a block diagram of an example of an I/O packet, in accordance with an embodiment.

FIG. 4 is a block diagram of an example of an I/O packet, in accordance with embodiments. The I/O packet 400 shown in FIG. 4 may be used to exchange I/O packets between the upper device 106 and the lower device 104 using the push-push communications model described herein. The I/O packet 400 includes the payload data 402 and a packet header 404 that includes control information that identifies, among other things, the source and destination of the payload data exchanged between the lower device 104 and the upper device 106. In the case of inbound communications, the payload data includes the data to be transferred to the corresponding memory associated with the upper device 106. In the case of outbound communications, the payload data includes the data read from memory and transferred to the lower device 104. For example, the payload data may be data to be included in the payload of an outbound Ethernet frame or stored to an external storage device.

The I/O packet may include any suitable combination of fields, which may be used to identify the next steps to be taken by the upper device 106 or the lower device 104 to process the data. As shown in FIG. 4, the I/O packet 400 can include a destination data flow identifier 406 and a source data flow identifier 408. The upper device 106 and the lower device 104 may determine the destination of the payload data pushed to it using the destination data flow identifier 406 alone or in combination with the source data flow identifier 408. With regard to inbound data, the source data flow identifier 408 may be useful when an upper device 106 is coupled to two or more lower devices 104. Each destination data flow identifier 406 may be unique within a specific lower device 104, and different lower devices 104 may not be aware of the flow identifiers used by other lower devices 104. Thus, the combination of the source data flow identifier 408 and the destination data flow identifier 406 may be used by the upper device 106 to determine the actual destination of the I/O packet's payload data received from a lower device 104.

With regard to outbound data, the source data flow identifier 408 may be useful when a lower device 104 is coupled to two or more upper devices 106. Each destination data flow identifier 406 may be unique within a specific upper device 106, and different upper devices 106 may not be aware of the flow identifiers used by other upper devices 106. Thus, the combination of the source data flow identifier 408 and the destination data flow identifier 406 may be used by the lower device 104 to determine the actual destination of the I/O packet's payload data received from an upper device 106. In embodiments, the destination data flow identifier 406 and source data flow identifier 408 are unique within the coherency domain to enable transparent failover across multiple upper devices 106 and multiple lower devices 104. Furthermore, with regard to inbound data the source data flow identifier 408 may be used to evaluate access privileges of the lower device 104. In this way, the memory integrity may be protected in the event that a malfunctioning lower device 104 attempts to erroneously write data to a memory address that has not been allocated to it.

The I/O packet header 404 can also include a frame sequence number 410 that is used to identify the order of the bytes sent, so that the data can be reconstructed in the proper order. The I/O packet header 404 can also include an operation code 412 that specifies an operation to be performed, depending on the type of lower device 104. For example, the operation code 412 may include an indication of Read, Write, Status, Configure, Reset (range of reset options possible), Error Notification, and Error Recovery Notification, among others. In embodiments, the packet may also include a Frame Check Sequence (FCS) 414 used for error correction and detection. It will be appreciated that the I/O packet 400 show in FIG. 4 is but one example of an I/O packet 400 in accordance with present embodiments, as various elements may be added or removed in accordance with a particular implementation.

Figure 5:
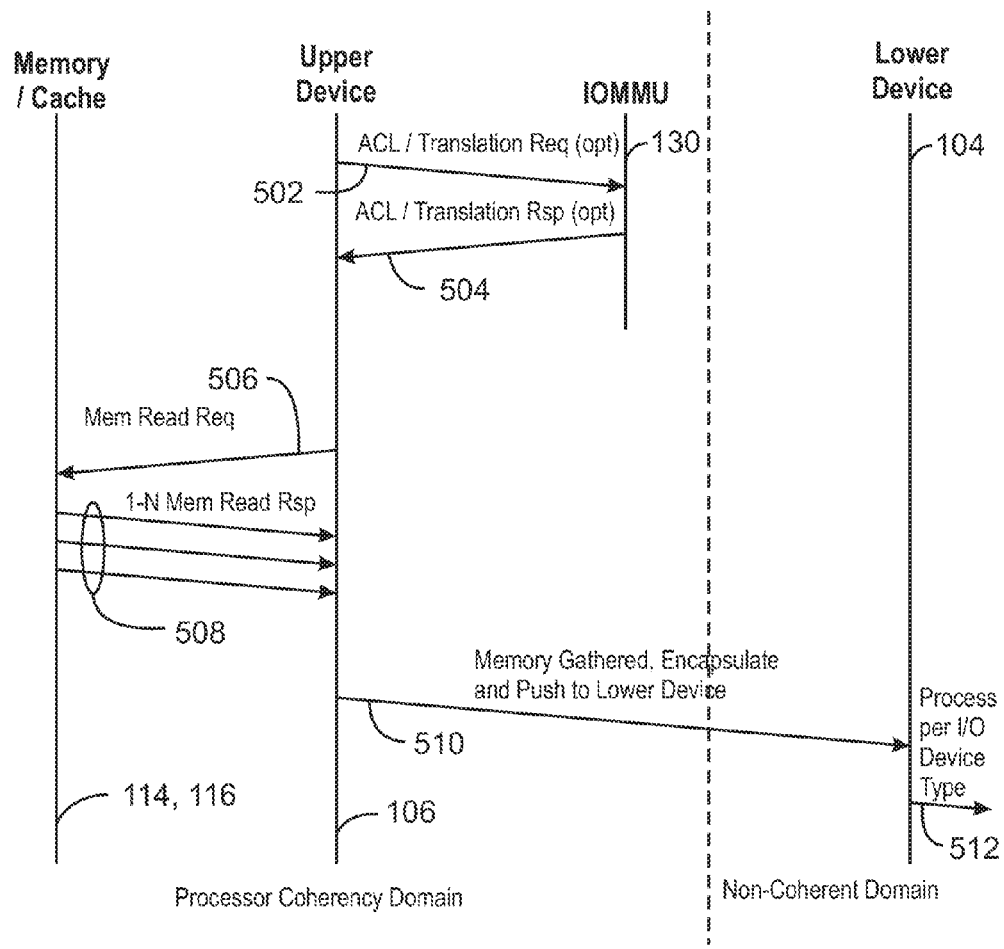
FIG. 5 is a process flow diagram of an example of an outbound write operation, in accordance with an embodiment.

FIG. 5 is a process flow diagram of an example of an outbound write operation, in accordance with embodiments. The outbound write operation is referred to by the reference number 500. An outbound write operation 500 may be initiated by software running on the processor, for example, the operating system, an application, or a device driver corresponding to the lower device 104. As shown in FIG. 5, the outbound write operation 500 may begin with an access control and address translation request sent from the upper device 106 to the IOMMU 130, as indicated by arrow 502. In response to the request, the IOMMU 130 identifies a physical memory address corresponding to the operation and determines whether the requesting process has access rights to the memory addresses. As indicated by arrow 504, the IOMMU 130 returns a response to the upper device 106, which may include a validation of the access rights as well as the physical memory addresses for the operation. In embodiments, the process initiating the outbound write operation 500 may refer to an actual physical memory address, in which case the address translation process may be skipped. In an embodiment, the write operation may access a vector of memory addresses, such as a set of <address, length> tuples.

As indicated by arrow 506, the upper device 106 then sends a memory read request to the appropriate memory 114 or 116, which may be, for example, a processor integrated memory or cache, discrete memory or cache, or upper device-integrated memory or cache. The memory 114 or 116 may be accessed directly through hardware, such as the memory controller 110, or indirectly through software using, for example, load/store semantics that enable data to be read from the cache 116 or main memory 114 by one or more of the processor cores 108. A series of memory read responses may then be issued by the memory to the upper device 106, as indicated by arrows 508. The upper device 106 gathers the data, encapsulates the data into packets, and pushes the data to the lower device 104, as indicated by arrow 510. Each data packet generated by the upper device 106 includes the data flow identifier in the packet header. During the outbound write operation neither the processor nor the upper device 106 directly accesses resources of the lower device 104.

Upon receiving the data packet from the upper device 106, the lower device 104 processes the data packet according to the device specific protocols, as indicated by arrow 512. For example, in the case of an Ethernet-based lower device 104, the lower device 104 encapsulates the payload data in an Ethernet frame. Header information for the Ethernet frame may be determined based on the information in the lower device's data flow identifier table entry corresponding to the data flow identifier received from the upper device 106. The lower device 104 then transmits the Ethernet frame to the external device. In the case of a graphics processor, for example, the lower device 104 may perform various graphics calculations on the received data send the results to a graphics frame buffer. In the case of a storage controller, for example, the lower device 104 may identify one or more physical storage addresses, and the send the payload data to storage. In an embodiment, the logical unit numbers associated with the storage operation may be extracted from the I/O packet header. In an embodiment, the logical unit numbers may be configured within the lower device 104 to be associated with a particular data flow identifier.

Figure 6:
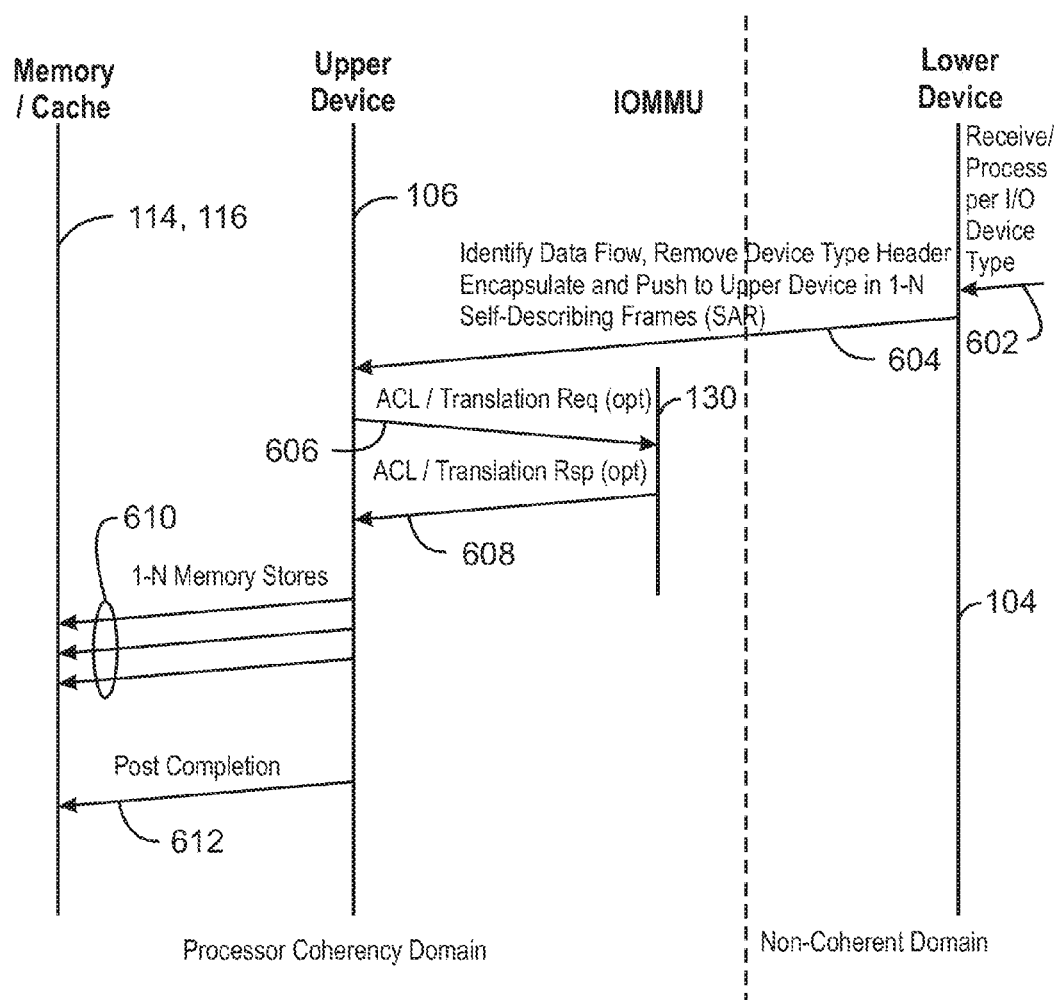
FIG. 6 is a process flow diagram of an example of an inbound write operation, in accordance with an embodiment.

FIG. 6 is a process flow diagram of an example of an inbound write operation, in accordance with embodiments. The inbound write operation is referred to by the reference number 600. As indicated by the arrow 602, an inbound write operation 600 may be initiated by the lower device 104. For example, an inbound write operation 600 may be initiated by a process running on the lower device 104 or an event such as receipt of a packet by the lower device 104 from an external device. The lower device 104 acquires a data flow identifier corresponding to the inbound write. For example, in the case of an Ethernet frame received by the lower device 104 from an external device, the source ID and destination ID of the received Ethernet frame may be used to acquire one or more data flow identifiers from the data flow lookup table, for example, as destination data flow identifier and a source data flow identifier, as described in relation to FIG. 4. The payload data may be extracted from the Ethernet Frame and encapsulated in a local I/O packet, such as described in relation to FIG. 4. The local I/O packet header includes the corresponding data flow identifiers extracted from the lookup table. In embodiments, the payload data may be encapsulated in multiple I/O packets. The one or more data packets may be transmitted to the upper device 106, as indicated by arrow 604.

Upon receipt of the data packets, the upper device 106 parses the I/O packet header to identify the corresponding data flow resources of the upper device 106, based on the data flow identifiers contained in the packet header. For example, the flow identifier may be used to identify a receive queue corresponding to the inbound write. In embodiments, the receive queue includes a virtual memory address or lookup address associated with the write operation. As indicated by arrow 606, the upper device 106 may then send an access control request and an address translation request to the IOMMU 130 using the corresponding virtual memory address or lookup address. The IOMMU 130 identifies a physical memory address corresponding to the operation and determines whether the requesting process has access rights to the corresponding memory address. As indicated by arrow 608, the IOMMU then returns a response to the upper device 106, which may include a validation of the access rights as well as the physical memory addresses for the operation. As discussed above, in relation to FIG. 1, the IOMMU may also invalidate subsequent access to the corresponding memory address translation. For example, when the upper device 106 posts the completion event for the write operation, the upper device 106 may update the IOMMU tables to remove the translation or otherwise indicate that the access rights are suspended or removed. In an embodiment, the receive queue contains an actual physical memory address, in which case the address translation process may be skipped.

Upon identifying the physical memory addresses corresponding to the inbound write operation, the upper device 106 initiates one or more memory store operations addressed to the physical memory addresses, as indicated by arrows 610. The memory 114 or 116 may be, for example, a processor integrated memory or cache, discrete memory or cache, or upper device-integrated memory or cache. After the final memory store has been completed, the upper device 106 posts a completion indicator to the corresponding completion queue, as indicated by arrow 612. As with the outbound write operation, neither the processor nor the upper device 106 accesses resources of the lower device 104.

Figure 7:
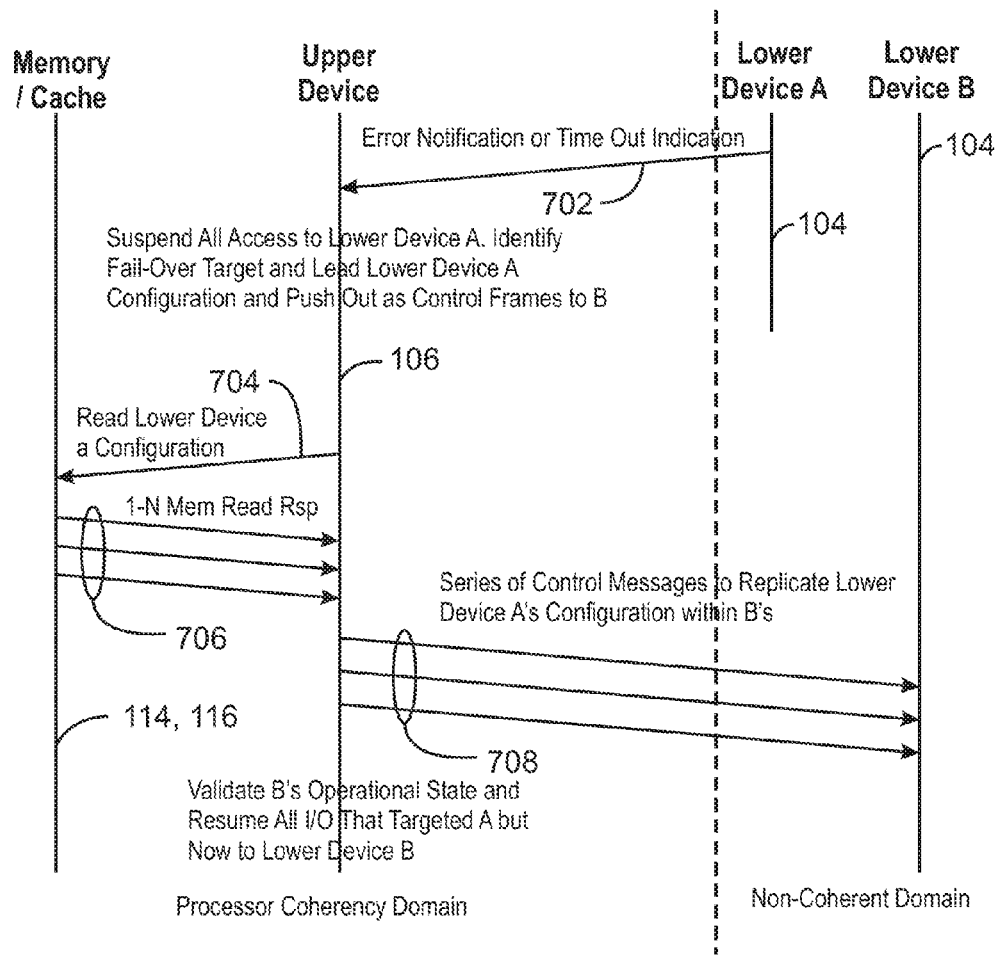
FIG. 7 is a process flow diagram of an example of a link-failover operation, in accordance with an embodiment.

FIG. 7 is a process flow diagram of an example of a link-failover operation, in accordance with embodiments. The link-failover operation is referred to by the reference number 700. As shown in FIG. 7, the failover process involves a failover from lower device A to lower device B. As discussed above, a set of initial configuration operations may be performed to associate an upper device 106 with a specific lower device 104. During the initial configuration, the various information tables, such as the data flow ID table 154 and the Data flow management table 126, are populated with all of the information used to establish communications between the two devices. In a tail-over configuration, software may separately store the configuration information for the upper device 106 and the lower device 104 to memory 114 or 116, including any subsequent updates should something change over time. The memory may be, for example, a processor integrated memory or cache, discrete memory or cache, or upper device-integrated memory or cache.

The failover process may be initiated by lower device A by sending an error notification or time out indication to the upper device 106, as indicated by arrow 702. Upon receiving the notification, the upper device 106 suspends access to lower device A and software may be invoked to identify a suitable fail-over target. The upper device 106 then determines the configuration of lower device A by sending a read request to the memory 114 or 116 to access the previously stored configuration information, as indicated by arrow 704. The memory controller then sends one or more read responses to the upper device 106 containing information related to the configuration of lower device A, as indicated by arrows 706. Upon receiving the configuration data, the upper device 106 sends one or more control messages to replicate the configuration of lower device A within lower device B, as indicated by arrows 708. For example, new data flow identifiers may be constructed, resources assigned, policies configured, and the like. The data flow associations between the upper device 106 and the prior lower device 104 are now configured in the lower device 104. As with the inbound and outbound write operations, neither the processor nor the upper device 106 accesses the resources of lower device A or lower device B to implement the failover.

Once configured, the upper device 106 and lower device B 104 can now communicate with one another and the operations associated with the prior device's data flows are resumed. The entire process can occur completely transparent to the application and the outside world since there is no data loss and in this case, the new lower device B 104 may announce itself as the new port for the prior lower device A 104. For example, in Ethernet, a message could be broadcast to announce a given MAC address is now at the source port represented by lower device B.

Figure 8:
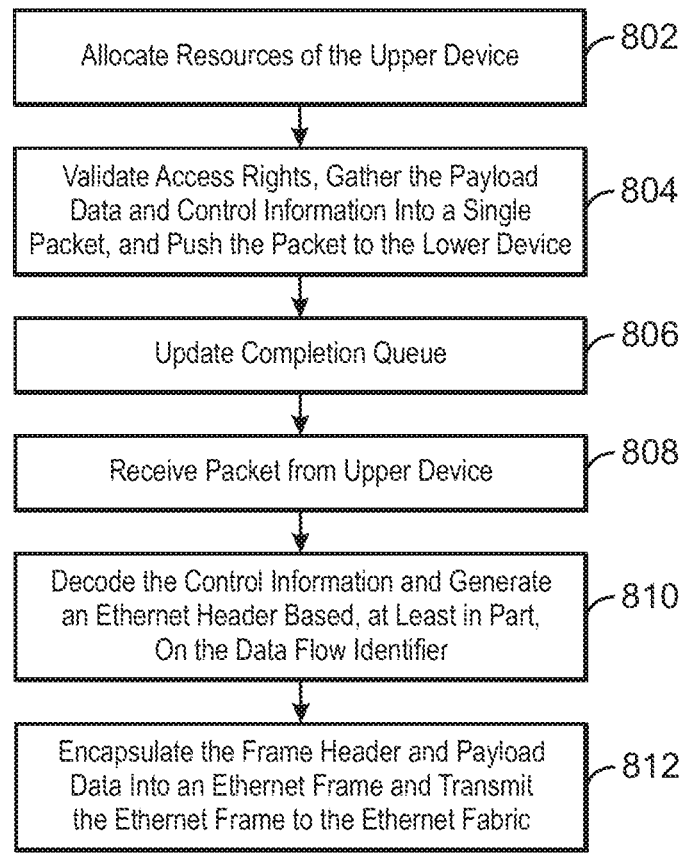
FIG. 8 is a process flow diagram of a method of processing an outbound Ethernet frame, in accordance with an embodiment.

FIG. 8 is a process flow diagram of a method of processing an outbound Ethernet frame, in accordance with embodiments. The method is referred to by reference number 800. Referring also to FIG. 1, the processes described in blocks 802-806 may be performed by the upper device 106 and the processed described in blocks 808-812 may be performed by the lower device 104. For purposes of the description of FIG. 8, it is assumed that the lower device 104 is an Ethernet-based communications device, such as a network interface card.

To generate an outbound Ethernet frame, an Ethernet device driver may be invoked. At block 802, resources of the upper device 106 may be allocated to the device driver, which programs the allocated resources with the appropriate memory gather list and any device-specific control information, including one or more data flow identifiers. In an embodiment, the lower device 104 may contain resource sets for one or more MAC addresses, and each data flow identifier constructed during the configuration process may identify one of these MAC resource sets. In an embodiment, the data flow resource may be configured with the source and destination MAC addresses to use as well as all of the information needed to construct an Ethernet frame.

At block 804, the upper device 106 validates access rights, gathers the payload data and control information into a single packet, and pushes the packet to the lower device 104. Data transfers that exceed a single local communication packet size can be segmented into multiple packets. At block 806, the upper device 106 updates the completion queue when it completes the last packet pushed to the lower device 104.

At block 808, the lower device 104 receives the packets from the upper device 106. At block 810, the lower device 104 decodes the control information and generates one or more Ethernet headers based, at least in part, on the data flow identifier. At block 812, the lower device 104 encapsulates the frame header and payload data into one or more Ethernet frames and transmits the Ethernet frames to the Ethernet fabric.

Figure 9:
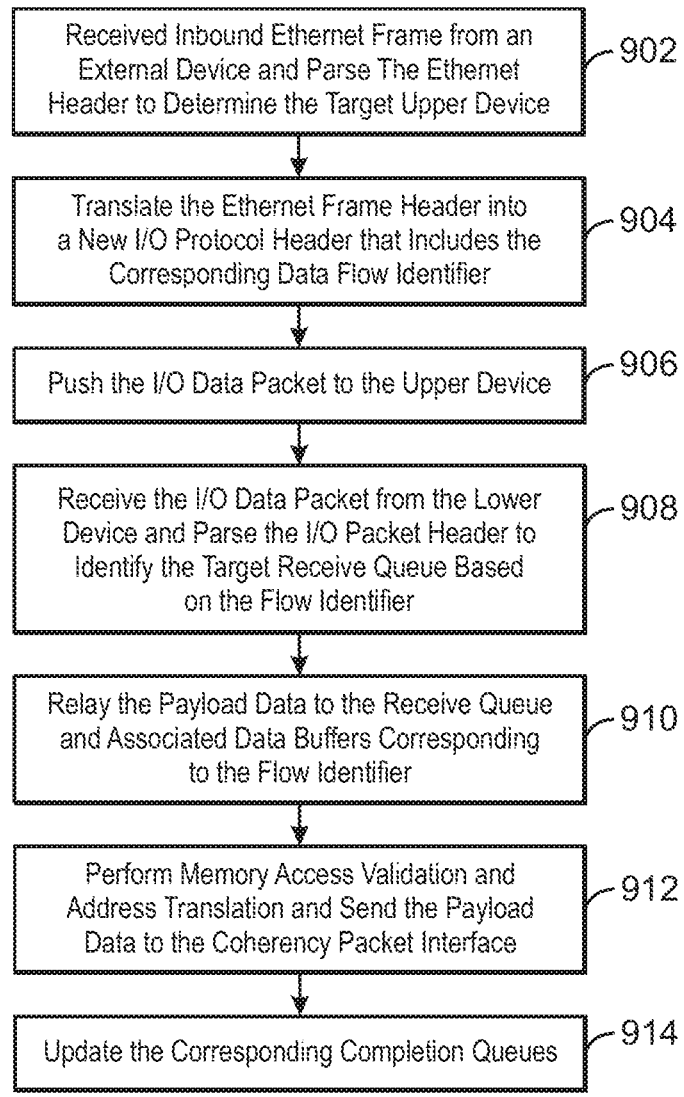
FIG. 9 is a process flow diagram of a method of processing an inbound Ethernet frame, in accordance with an embodiment.

FIG. 9 is a process flow diagram of a method of processing an inbound Ethernet frame, in accordance with embodiments. The method is referred to by reference number 900. Referring also to FIG. 1, the processes described in blocks 902-906 may be performed by the lower device 104 and the processed described in blocks 908-914 may be performed by the upper device 106. For purposes of the description of FIG. 9, it is assumed that the lower device 104 is an Ethernet-based communications device, such as a network interface card.

At block 902 the lower device 104 receives an inbound Ethernet frame from an external device and parses the Ethernet header to determine the target upper device 106. In embodiments, the lower device 104 can target multiple upper devices 106, for example, through an optical bus or crossbar. At block 904, the lower device 104 translates the Ethernet frame header into a new I/O protocol header that includes the corresponding data flow identifier. The I/O protocol header may also include additional information such as Quality of Service (QoS) data, among others. In embodiments, the lower device 104 replaces the Ethernet header with the new I/O protocol header, which encapsulates the Ethernet data payload. In embodiments, the new I/O protocol header encapsulates the entire Ethernet frame as it was received by the lower device 104, thereby preserving the original Ethernet header, which may be used for further processing by the upper device 106.

To identify which data flow identifier to use to push the payload data to the upper device 106, the lower device 104 may parse the Ethernet frame header to derive the information regarding the source and destination of the payload data. For example, the lower device 104 may identify the source and destination MAC Addressed, the VLAN Identifier, the priority, the Ethernet Type and the like. Using this information, the lower device 104 analyzes the pre-configured information contained in the data flow Id table 154 and determines which data flow identifier corresponds with the Ethernet packet. The upper device 106 and the lower device 104 may also be configured with a default data flow identifier to handle cases in which an Ethernet frame does not yield a particular data flow identifier. When an Ethernet frame is received on the default data flow identifier, software may be invoked that parses the information and determines how to proceed. For example, the Ethernet frame may correspond with a new destination address that was just acquired, in which case the software may configure a new association for that remote destination. In this way, new information may be acquired even if a data flow has not been pre-configured for the specific remote destination.

At block 906, the lower device 104 pushes the Ethernet frame to the upper device 106. At block 908, the upper device 106 receives the Ethernet frame from the lower device 104 and parses the header to identify the target receive queue based on the flow identifier. At block 910, the upper device 106 relays the payload data to one or more receive queues and associated data buffers. In embodiments, the upper device 106 can perform multicast operations to multiple receive queues by using the data flow identifier as a multicast group identifier.

At block 914, the upper device 106 also performs memory access validation and address translation. In an embodiment, the memory access validation and address translation is performed via the IOMMU. In an embodiment, the receive queue element may be programmed with the corresponding physical memory address, in which case the IOMMU may be bypassed.

At block 914, the upper device 106 sends the payload data to the coherency packet interface 200 and updates the corresponding completion queues. Unlike traditional PCI communications, the lower device 104 does not track any of the host resources.

Figure 10:
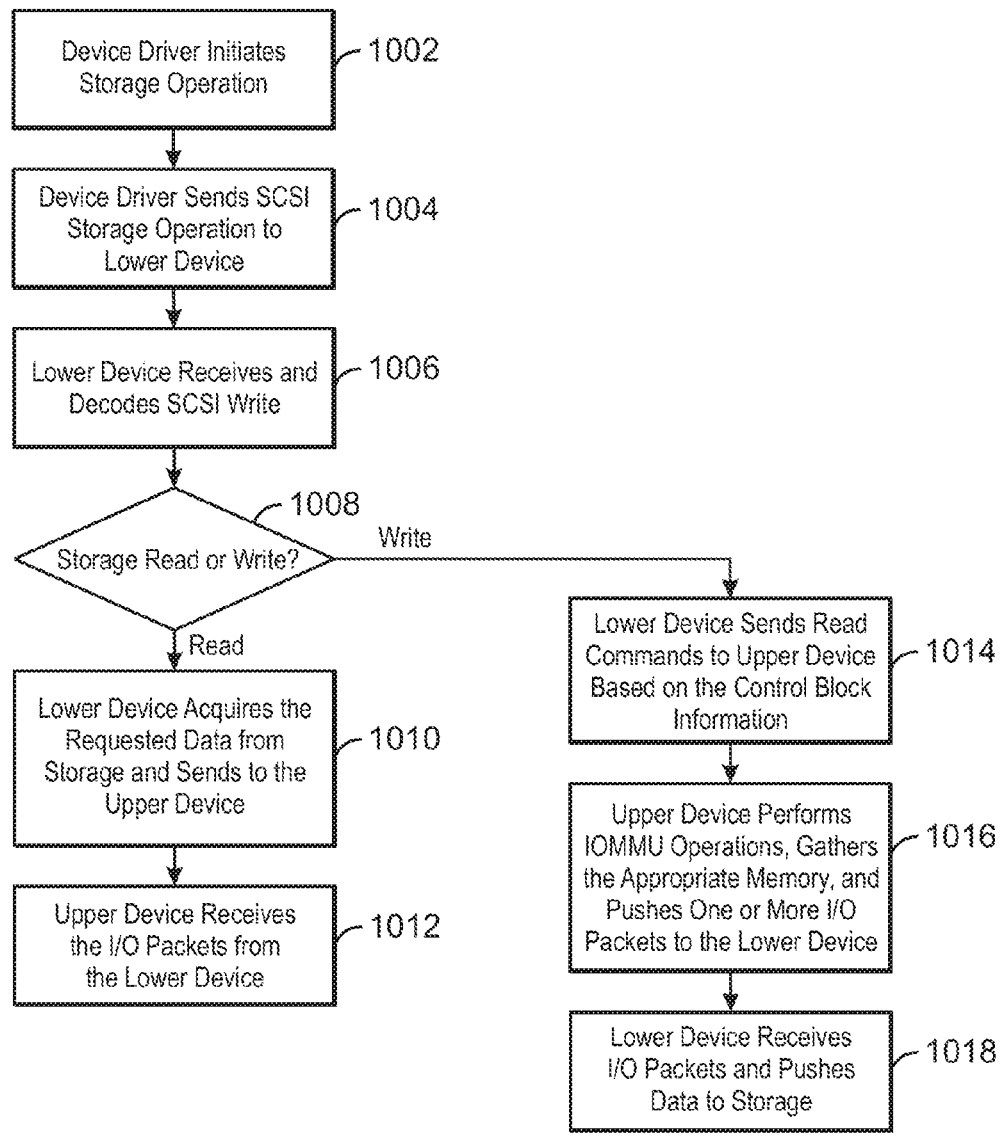
FIG. 10 is a process flow diagram of a method of conducting a storage write, in accordance with an embodiment.

FIG. 10 is a process flow diagram of a method of conducting a storage operation, in accordance with embodiments. The method is referred to by reference number 1000. For purposes of the description of FIG. 10, it is assumed that the lower device 104 is a device using a Small Computer System Interface (SCSI), such as a disk drive. Further, it will be appreciated that for purposes of the description of FIG. 10, the lower device 104 is a storage controller.

At block 1002, an initiator storage operation may be initiated by the device driver corresponding to the lower device 104. To process the SCSI reads and writes, the device driver generates a device-specific control block that the lower device 104 uses to process the storage controller's SCSI read and write requests. The control block may be maintained within the lower device 104 and includes the flow identifier corresponding to the operation. The device driver may also program the IOMMU with specific translations applicable to the storage operation.

At block 1004, an initiator issues a storage operation to the lower device 104 through an SCSI write. The initiator may be a computer or another storage controller in the case of peer-to-peer communication between storage controllers as in, for example, a tape back up being performed on a storage array. The payload of the SCSI write can include control information that determines how the lower device 104 processes the storage operation. For example, the payload of the SCSI write can include the data flow identifier and address information that identifies one or more logical unit numbers (LUNs) corresponding to the storage operation. The payload of the SCSI write can also include an SCSI command that identifies the storage operation as a storage read or a storage write.

At block 1006, the lower device receives and decodes the SCSI write. The lower device parses the payload data of the SCSI write to determine how to proceed. At block 1008, a determination is made regarding whether the storage operation is a storage write or a storage read. If the operation is a storage read, the process flow may advance to block 1010.

At block 1010, the lower device 104 acquires the requested data from storage and sends the data to the upper device 106 in one or more I/O packets. The lower device 104 may identify the requested data by using the data flow identifier to identify the appropriate information in the control block. The I/O packets sent to the upper device include the same data flow identifier issued to the lower device through the SCSI write at block 1002. At block 1012, the upper device 104 receives the I/O packets from the lower device 104 and uses the data flow identifier to associate the I/O packet's data payload to the appropriate data flow resources of the upper device 106.

If at block 1008 the operation is a storage write, the process flow may advance to block 1014. The storage write operation may be executed as a series of reads commands sent from the lower device 104 to the upper device 106 based on the information in the control block. For example, the reads may be in response to the storage target making a request for the next block of data. In this way, the lower device and the storage target work together to avoid the storage target being overrun with data since some storage media operate at significantly slower speeds compared to the high-speed I/O provided by the upper device 106 and lower device 104.

At block 1014, the lower device uses the data flow identifier received from the upper device to identify the appropriate information from the control block. Using the information from the control block, the lower device 104 issues a series of read commands to the upper device 106 via I/O packets that include the same data flow identifier issued to the lower device 104 at block 1004 through the SCSI write.

At block 1016, the upper device 106 decodes the packet header control information, performs any IOMMU operations, gathers the appropriate memory, and generates one or more I/O packets which are pushed to the lower device 104. The I/O packet payload includes the data to be written to storage. The packets pushed to the lower device 104 also include a packet header with control information, including the same flow identifier.

At block 1018, the lower device receives and decodes the I/O packets. The lower device 104 uses the flow identifier to identify the appropriate control block maintained in the lower device 104 corresponding to the operation. The lower device identifies the appropriate storage device memory addresses based on the data flow identifier and sends the payload data to storage.

Figure 11:
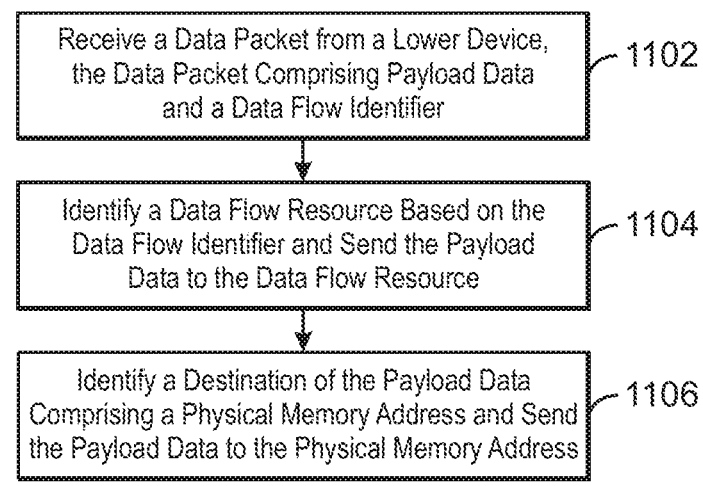
FIG. 11 is process flow diagram summarizing a method of processing local I/O, in accordance with an embodiment.

FIG. 11 is process flow diagram summarizing a method of processing local I/O, in accordance with embodiments. The method is referred to by the reference number 1100 and may begin at block 1102. At block 1102, the upper device 106 receives a data packet from a lower device 104. The data packet can include payload data and one or more data flow identifiers, including source data flow identifiers and destination data flow identifiers.

At block 1104, the upper device 106 identifies a data flow resource based on the data flow identifier and sends the payload data to the identified data flow resource. For example, the upper device 106 may identify one or more receive queues or receive queue elements corresponding to the data flow identifier. In embodiments, the IOMMU 130 receives the data flow identifier and provides a translation to the upper device 106, which identifies a receive queue element of the upper device 106 based on the data flow identifier. After providing the translation, the IOMMU 130 may remove the translation associating the data flow identifier with the receive queue element, in which case subsequent attempts to access the same translation may be blocked.

At block 1106, the upper device 106 identifies a destination of the payload data comprising a physical memory address and sends the payload data to the identified physical memory address. For example, the upper device 106 may send the data flow identifier to an IOMMU 130 and receive the physical memory address corresponding to the data flow identifier from the IOMMU 130. In embodiments, the receive queue element includes the physical memory address corresponding to the operation and access to the IOMMU 130 may be skipped.

Figure 12:
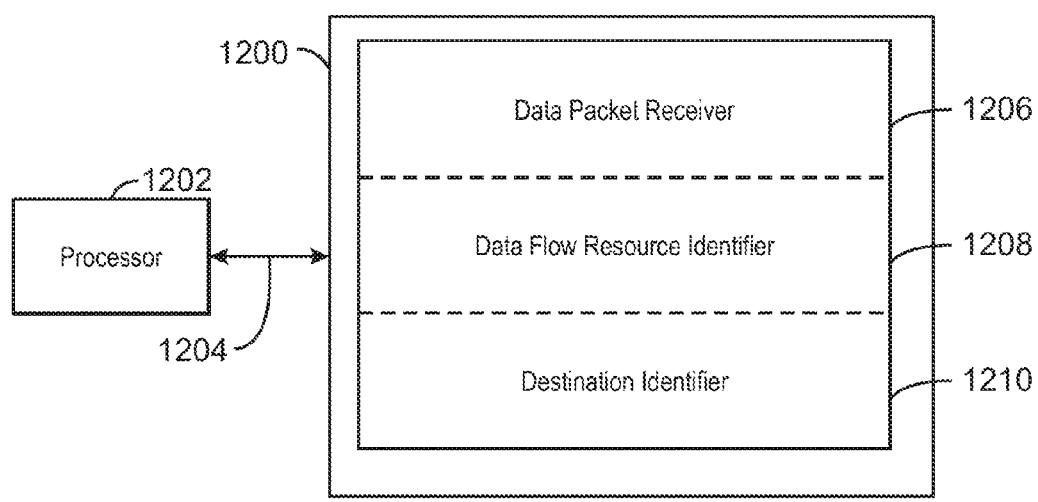
FIG. 12 is a block diagram showing a non-transitory, computer-readable medium configured to process local I/O, in accordance with an embodiment.

FIG. 12 is a block diagram showing a non-transitory, computer-readable medium configured to process local I/O, in accordance with embodiments. The non-transitory, computer-readable medium is referred to by the reference number 400. The non-transitory, computer-readable medium 400 can comprise RAM, a hard disk drive, an array of hard disk drives, an optical drive, an array of optical drives, a non-volatile memory, a universal serial bus (USB) drive, a digital versatile disk (DVD), a compact disk (CD), and the like. The non-transitory, computer-readable medium 400 may also be firmware used to control an electronic device, such as the upper device 106 and the lower device 104. In some embodiments, the non-transitory, computer-readable medium 400 may also be an Application Specific Integrated Circuit (ASIC).

As shown in FIG. 12, the various components discussed herein can be stored on the non-transitory, computer-readable medium 400. A first region 1206 on the non-transitory, computer-readable medium 400 can include a data packet receiver that receives data packets from the lower device, including payload data and a data flow identifier. A region 1208 can include data flow resource identifier that identifies a data flow resource based on the data flow identifier and sends the payload data to the data flow resource. A region 1210 can include a destination identifier that identifies a destination of the payload data, which may include a physical memory address corresponding, for example, to a cache or main memory address associated with the operation. The destination identifier may send the payload data to the physical memory address.

What is claimed is:

1. An electronic device, comprising:
   an upper device comprising an input/output (I/O) memory management unit (IOMMU);
   a lower device configured to process local input/output communications between the electronic device and the upper device, wherein the lower device stateless;
   a memory comprising a data flow identifier used to associate a data flow resource of the upper device with a data flow resource corresponding to the lower device;
   wherein a data packet sent from the lower device to the upper device includes the data flow identifier and payload data, wherein the IOMMU is configured to use the data flow identifier to identify a physical memory address to place the payload data without receiving the physical memory address or a virtual memory address corresponding to the physical memory address from the lower device.

2. The electronic device of claim 1, wherein the data flow identifier includes a plurality of fields that uniquely identify the data flow resource of the upper device.

3. The electronic device of claim 1, wherein the memory comprising the data flow identifier is populated based on control commands sent to the lower device from the upper device.

4. The electronic device of claim 1, wherein the lower device is operatively coupled to the upper device through two or more communications ports, and the lower device is configured to stripe data sent to the upper device across the two or more communication ports.

5. The electronic device of claim 1, wherein the data flow identifier in the data packet sent from the lower device to the upper device includes a hint that the payload data included in the data packet has near-term use and, in response to the hint, the upper device places the payload data in a processor cache.

6. The electronic device of claim 1, wherein the lower device is a Network Interface Card (NIC) configured to identify network protocol information using the data flow identifier and generate an outbound data frame based on the network protocol information.

7. The electronic device of claim 1, wherein the lower device is a storage device configured to identify control block information residing on the lower device using the data flow identifier and generate storage protocol information based on the control block information.

8. A method of processing local input/output, comprising:
   generating a data packet comprising payload data and a data flow identifier; and
   pushing the data packet to a host, wherein a data flow resource of the host is identified by the host using the data flow identifier, wherein the data flow identifier is configured to identify a queue element, to extract a look-up address contained in the queue element, and to translate the look-up address into a physical memory address used to place the payload data without receiving the physical memory address or a virtual memory address corresponding to the physical memory address.

9. The method of claim 8, comprising receiving a data packet from an external source and identifying the data flow identifier based on header information of the data packet.

10. The method of claim 8, comprising receiving one or more control commands from the host and generating a control block based on the control commands, the control block including the data flow identifier.

11. The method of claim 10, wherein the control block includes information corresponding to a storage read or write operation.

12. The method of claim 8, comprising generating a second data packet comprising the payload data and a second data flow identifier and pushing the second data packet to a second host.

13. A non-transitory, computer-readable medium comprising code configured to direct a processor to:
   generate a data packet comprising payload data and a data flow identifier; and
   push the data packet to a host, wherein a data flow resource of the host is identified by the host using the data flow identifier, wherein the data flow identifier is used to identify a queue element, to extract a look-up address contained in the queue element, and to translate the look-up address into a physical memory address used to place the payload data without receiving the physical memory address or a virtual memory address corresponding to the physical memory address.

14. The non-transitory, computer-readable medium of claim 13 comprising code configured to direct the processor to receive an Ethernet packet from an external device, and identifying the data flow identifier based on Ethernet header information of the Ethernet packet.

15. The non-transitory, computer-readable medium of claim 13 comprising code configured to direct the processor to receive one or more control commands from the host and generating a control block based on the control commands, the control block including the data flow identifier.

16. The electronic device of claim 1, wherein direct access to the IOMMU is limited for the lower device.

17. The electronic device of claim 1, wherein a destination for the data packet sent from the lower device to the upper device is determined based on the data flow identifier.

18. The method of claim 8, wherein the queue element contains a descriptor that defines how to process the data packet.

19. The method of claim 8, wherein the payload data is placed in application memory.

20. The method of claim 8, comprising sending an error notification to initiate a failover process, wherein the failover process suspends access to the host.

* * * * *